United States Patent [19]
Wildey

[11] Patent Number: 5,785,101
[45] Date of Patent: Jul. 28, 1998

[54] TREE HARVESTING AND PROCESSING HEAD

[75] Inventor: Allan John Wildey, Paris, Canada

[73] Assignee: Timberjack Inc., Ontario, Canada

[21] Appl. No.: 873,164

[22] Filed: Jun. 11, 1997

Related U.S. Application Data

[63] Continuation of Ser. No. 557,259, Nov. 14, 1995, abandoned.

[51] Int. Cl.[6] .................................................. A01G 23/08
[52] U.S. Cl. .......................... 144/4.1; 144/24.13; 144/338; 144/343
[58] Field of Search ................. 144/4.1, 24.13, 144/34.1, 338, 343; 30/379, 379.5

[56] References Cited

U.S. PATENT DOCUMENTS

| | | |
|---|---|---|
| 3,542,099 | 11/1970 | Gibson ........................................ 144/338 |
| 3,768,529 | 10/1973 | McColl . |
| 3,981,336 | 9/1976 | Levesque . |
| 4,194,542 | 3/1980 | Eriksson ................... 144/24.13 |
| 4,239,067 | 12/1980 | Mononen ................... 144/24.13 |
| 4,515,192 | 5/1985 | Eriksson ................... 144/24.13 |
| 4,552,191 | 11/1985 | Kuusilinna . |
| 4,881,582 | 11/1989 | Ketonen . |
| 4,922,976 | 5/1990 | Hacker . |
| 4,974,648 | 12/1990 | Propst ..................... 144/24.13 |
| 5,082,036 | 1/1992 | Vierikko . |
| 5,143,131 | 9/1992 | Seigneur et al. . |
| 5,186,227 | 2/1993 | Eriksson . |
| 5,219,010 | 6/1993 | Eriksson . |
| 5,355,920 | 10/1994 | Tanguay ................... 144/24.13 |

FOREIGN PATENT DOCUMENTS 2412255  7/1979  France .

*Primary Examiner*—W. Donald Bray
*Attorney, Agent, or Firm*—Brian W. Gray

[57] ABSTRACT

A head for harvesting and processing a tree is disclosed with drive rollers which can be pivoted away from the grapple arms to enable the head to select a tree from a group of felled trees for processing when the rollers are pivoted back into place.

12 Claims, 4 Drawing Sheets

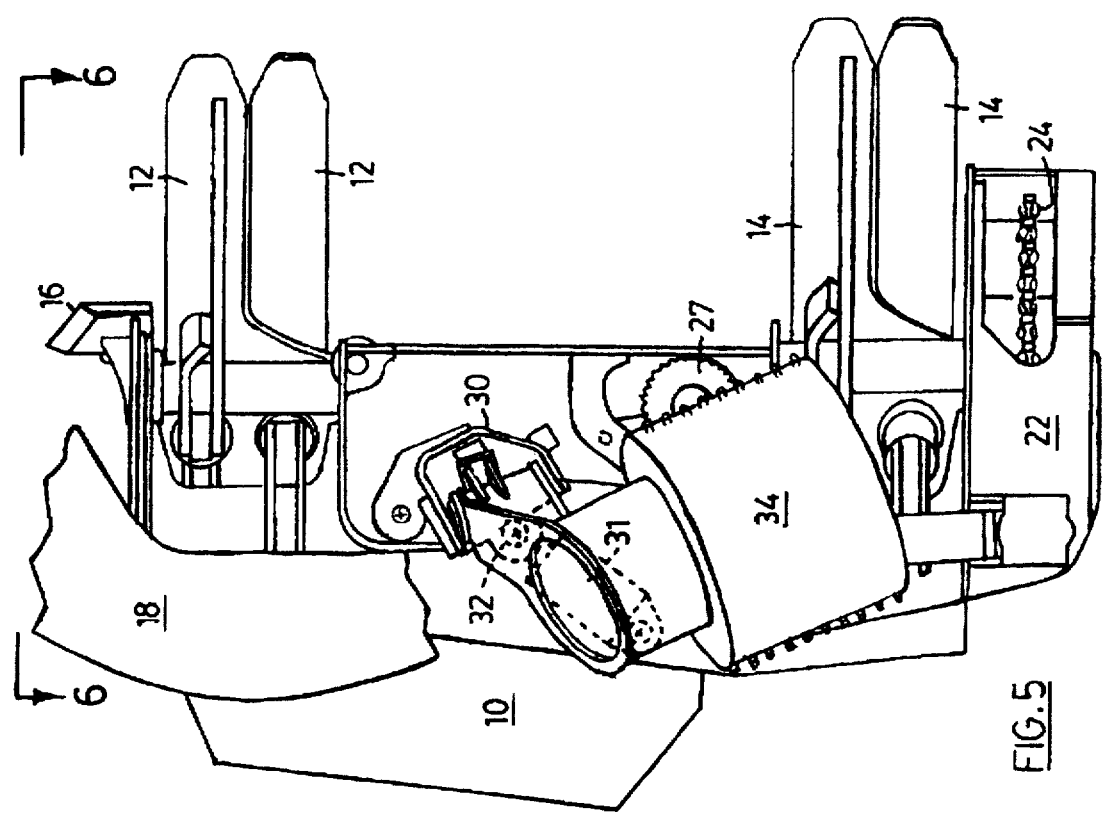
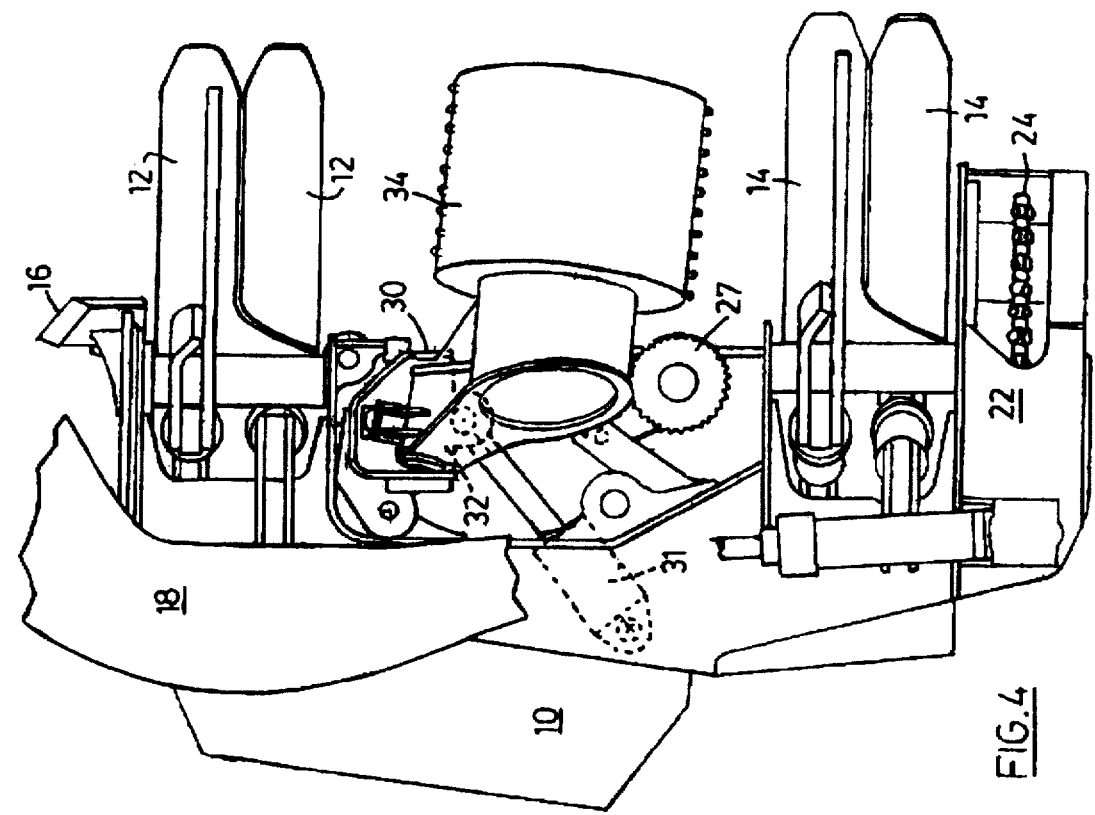

TREE HARVESTING AND PROCESSING HEAD this application is a continuation of application Ser. No. 08/557,259, filed Nov. 14, 1995, now abandoned.

FIELD OF THE INVENTION

This invention relates to logging machines. More specifically, the present invention relates to heads for harvesting and processing trees. Harvesting and processing include felling, delimbing, cross-cutting (including topping and bucking), sorting and piling trees.

BACKGROUND OF THE INVENTION

Processing machines for trees are known in which the length of a tree is driven between rollers and the rollers' can move towards a tree to grab it and away from a tree to release it. Grappling and delimbing arms are commonly used for holding a tree during harvesting or for selecting a felled tree, for example, from a pile of trees. Such arms also help to position the tree between the rollers. For the delimbing function, after the drive rollers have been engaged, the arms commonly have a sharp edge which acts as a knife. In addition, the machine may be provided with one or more fixed or moveable knives.

The functions previously described may be mounted on a separate head which may in addition have a cutting device such as a chain or disk saw. The head is connected to a mobile machine such as tractor or crane. Drive rollers may or may not comprise a part of the head.

The head can be pivotally connected to the mobile machine so that it can be turned horizontally or vertically as needed and can be rotatably mounted to address a tree to be cut.

In U.S. Pat. No. 5,355,920, Tanguay describes a head mounted on the arm of a crane, having at least two pairs of arms and one or more cutting devices. However, drive rollers are not on the processing head.

U.S. Pat. Nos. 3,542,099 (Gibson), 4,442,191 (Kuusilinna), 4,881,582 (Ketonen), 5,082,036 (Vierikko) and 5,143,131 (Seigneur et al.) disclose harvesting heads with two pairs of delimbing arms, one or more fixed knives and a cutting device, with driving rollers attached to the head. Rollers are generally parallel one to the other and could be moved toward and away from each other to accommodate different tree widths. In one embodiment of Gibson's patent, delimbing can also be effected by rotating the tree. A similar feature is disclosed in U.S. Pat. No. 4,922,976 (Hacker).

Drive rollers capable of moving in a single plane toward and away from each other, however, have a limited ability of accommodating different tree widths. As the diameter of a tree becomes significantly larger or smaller, the rollers tend to have only a partial contact with the tree trunk. This increases the roller pressure necessary to drive the tree during the delimbing process and considerably reduces the useful life of rollers. Thus, in U.S. Pat. No. 5,219,010, Erikkson discloses a device in which rollers can be moved in more than one plane. To accommodate different tree widths, the rollers may be moved toward and away from each other, as well as raised and lowered in the direction of their axes of rotation. In all positions, the axes of rotation of the rollers are parallel one to the other and perpendicular to the longitudinal axis of a tree driven therebetween.

In U.S. Pat. No. 3,981,336, Levesque discloses drive rollers which are substantially mounted on the grappling arms, and therefore capable of being pivotally moved toward and away from each other. A good contact between the rollers and a tree is also enhanced by a conical shape of the rollers.

The 762B single grip harvesting head sold by Timberjack Inc. of Woodstock, Ontario, Canada, also has a body with two pairs of grappling/delimbing arms and a pair of drive rollers therebetween. Although capable of moving toward and away from each other only in a single plane, rollers of this harvesting head are offset, i.e. their axes, while being generally perpendicular to the longitudinal axis of the tree, are not parallel one to the other so as to provide better support for the weight of the tree.

Prior art harvesting heads, particularly relatively recent ones such as the above described model 762B, have come to satisfy a wide range of requirements in the industry. However, known heads are generally not suitable for processing trees that have already been felled and piled, as the drive rollers are positioned in a manner which interferes with the grappling action of the arms.

Movement of the drive rollers out of the way must be done by a design which is sturdy and relatively simple since the forest environment (i.e. falling trees) can easily damage machinery. In addition, in many modern operations, not all trees are cut and space is at a premium so that the design must be compact so that the rollers do not, as far as possible, when retracted, interfere with surrounding trees or machinery or prevent free movement of the head in a timber stand.

The present invention overcomes the limitations of prior art devices and provides a harvesting and processing head capable of performing both harvesting and delimbing and also sorting and piling.

SUMMARY OF THE INVENTION

The present invention provides a tree processing and harvesting head comprising a body with means for attaching the head to a mobile machine; at least one pair of grappling arms, pivotally mounted to the body for movement toward and away from each other, the grappling arms defining therebetween a grappling zone which extends along the length of the head; a delimbing knife; a cutting device; and at least one pair of drive rollers wherein the drive rollers are pivotally mounted for movement from and to a processing position in which the rollers are in the grappling zone and from and to a grappling position in which the rollers are outside of the grappling zone.

Other features and advantages of the present invention will become apparent from the detailed description of the preferred embodiments.

BRIEF DESCRIPTION OF THE DRAWINGS

For a better understanding of the present invention and to show more clearly how it may be carried into effect, reference will now be made by way of example to the accompanying drawings, which show the tree processing and harvesting head according to the preferred embodiment of the present invention and in which:

FIG. 4 is a side view of a portion of the tree processing and harvesting head of FIG. 1, with drive rollers positioned for processing a tree;

FIG. 5 is a side view of a portion of the tree processing and harvesting head of FIG. 1, with drive rollers positioned for grappling a tree.

DETAILED DESCRIPTION OF THE PREFERRED EMBODIMENT

Figure 1:
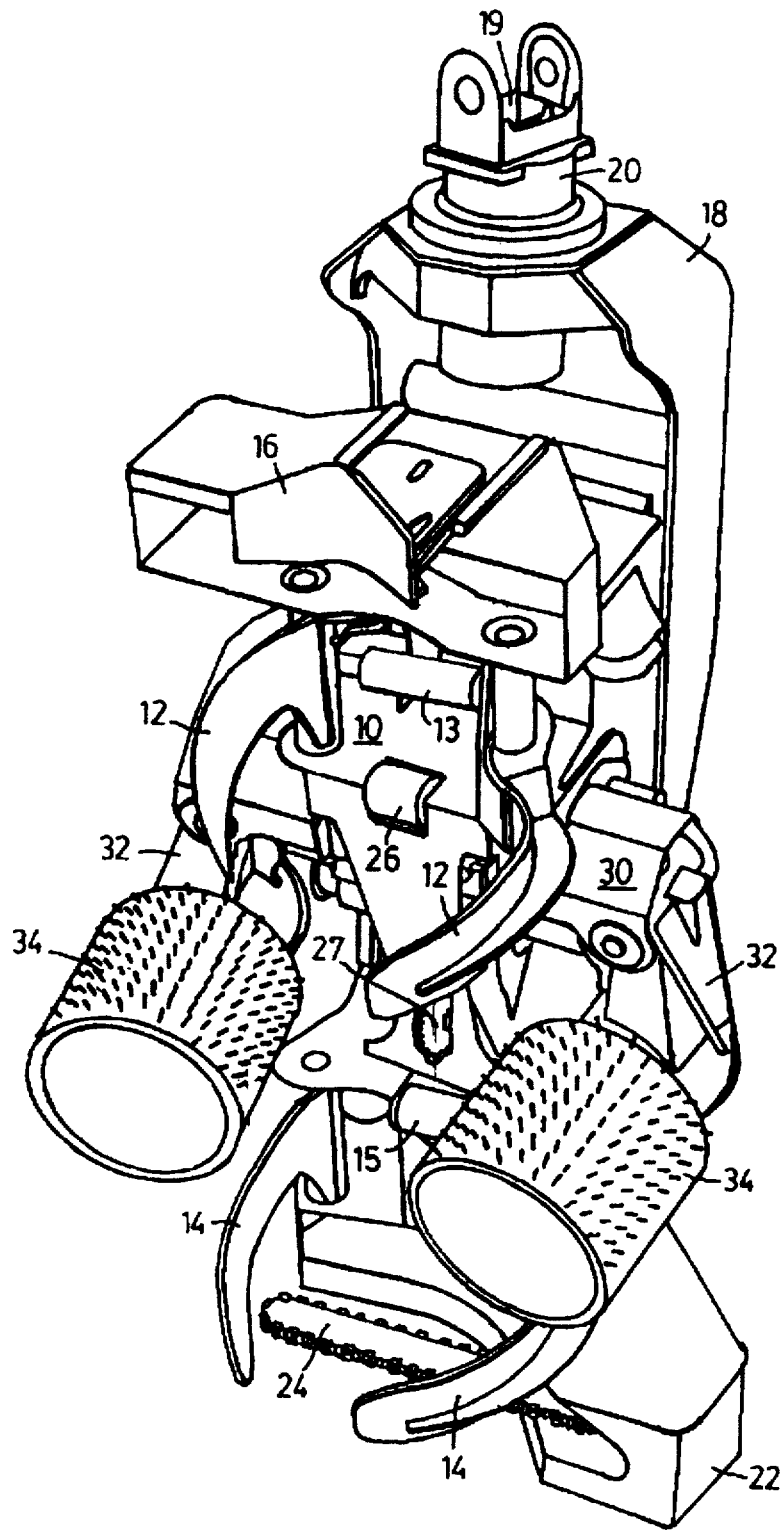
FIG. 1 is a perspective view of a tree processing and harvesting head according to the preferred embodiment of the present invention.

Referring to FIG. 1, a tree processing and harvesting head according to the invention has a body 10. Two grappling arms 12 are pivotally attached to the body 10 near the top end and two grappling arms 14 are pivotally attached to the body 10 near the bottom end thereof. Each pair of arms 12, 14 is shaped to receive a tree therebetween, with the longitudinal axis of the tree parallel to the body 10. Each pair of arms 12, 14 is provided with respective pair of displacement means 13, 15, for example hydraulic cylinders, for pivotally moving the arms toward and away from each other, i.e. toward and away from the tree being processed. One or both pairs of grappling arms 12, 14 may include knives for delimbing the tree. A delimbing knife 16 is also mounted to the body 10. It can be slid inwardly or outwardly in order to conform to the shape of the tree. It will be appreciated that although normally the grappling arms are structured to perform the delimbing function that there can also be separate delimbing arms for this purpose.

A tilt frame 18 with the attachment means 20 is mounted on the back side of the body 10 (the side facing away from the tree), for attaching the processing and harvesting head to a mobile machine such as, for example, a tractor or a crane. Attachment means 20 contains within it rotary hydraulic means (not shown), for example a hydraulic motor, for rotating the head about axis 19. The tilt frame 18 allows the head to operate on trees in vertical, horizontal and intermediate positions and is provided with one or more displacement means (not shown), for example hydraulic cylinders, for bringing the head into and maintaining it in a desired position.

Mounted inside the housing 22 at the rear end of the body 10 is a high speed chain saw 24 for cutting tree lengths. The chain saw 24 is powered by a motor (not shown), for example a hydraulic or other motor.

Anti-friction wheel 26 is mounted on the body 10 between the two pairs of arms 12, 14, for reducing the friction of the moving trunk against the body 10. Also mounted on the body 10, respectively adjacent the two arms 14, are two potentiometers (not shown). The potentiometers are used for averaging the diameter of the tree. In addition, measuring wheel 27 is pivotally mounted on the body 10. It is hydraulically biased against a tree trunk and is automatically retracted on roller arm opening.

Figure 2:
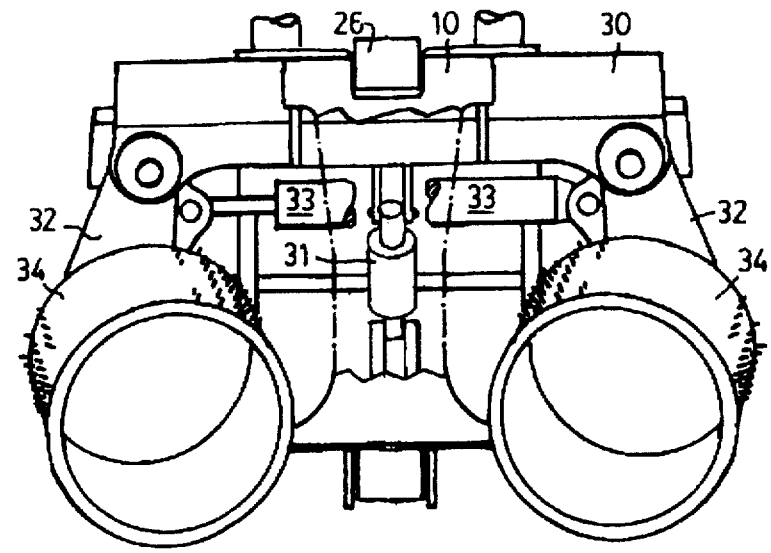
FIG. 2 is a front view of a portion of the tree processing and harvesting head of FIG. 1, with drive rollers positioned for processing a tree.
Figure 3:
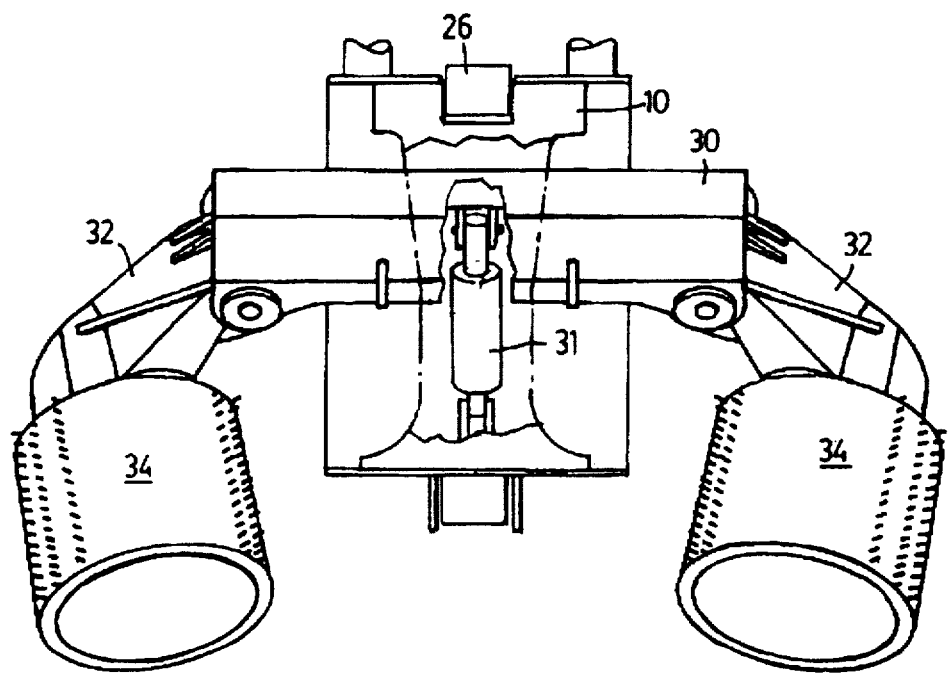
FIG. 3 is a front view of a portion of the tree processing and harvesting head of FIG. 1, with drive rollers positioned for grappling a tree.
Figure 6:
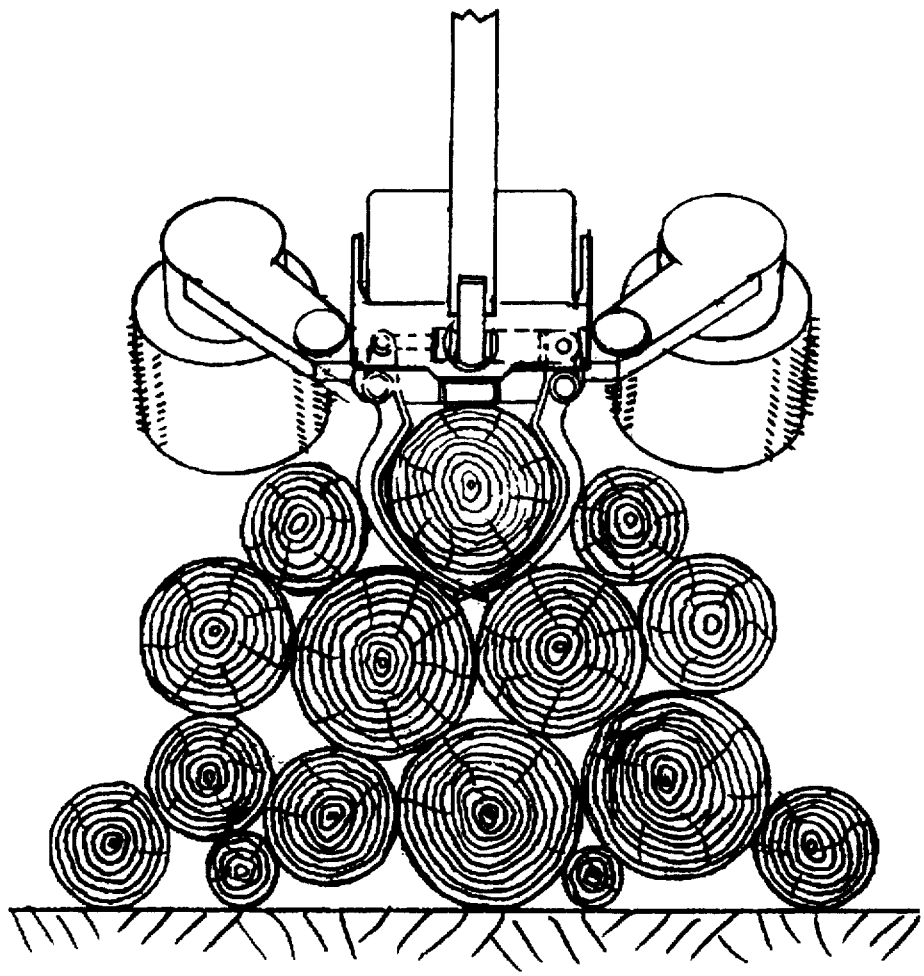
FIG. 6 is a view along the lines 6—6 in FIG. 5 and shows the head, with drive rollers retracted, positioned for selecting a tree from a pile of trees.

Transversely and pivotally mounted to the body 10 and positioned between the pairs of arms 12 and 14 is a cross beam 30. A support member 32 is pivotally mounted to each end of the cross beam 30. A drive roller 34 is mounted for rotation on each support member 32. The cross beam 30 is provided with a displacement means 31 (shown in FIGS. 4 and 5), for example a hydraulic cylinder, for pivotally moving the cross beam 30 between a processing position, in which the drive rollers 34 are positioned between the arms 12, 14 for driving the tree (FIGS. 2 and 4), and a grappling position, in which the drive rollers 34 are retracted to allow grappling the tree from a pile of felled trees (FIGS. 3 and 5). Each support member 32 is provided with a displacement means 33, for example a hydraulic cylinder, for pivotally moving the support members 32 and drive rollers 34 toward and away from each other, i.e. toward and away from the tree being processed.

Drive rollers 34 are offset, i.e. their axes, while being generally perpendicular to the longitudinal axis of the tree being processed, are not parallel one to the other. The advantages of such an orientation of the rollers have been already discussed in connection with the Timberjack's model 762B head, and include better tree support during delimbing, higher delimbing capacity and less feed roller pressure. In some embodiments of the invention, the rollers 34 may comprise spiked rollers, while in other embodiments the rollers 34 may include a solid rubber surface with friction enhancement such as chains for contacting the tree in a situation where spike penetration is undesirable.

Each drive roller 34 is powered by a motor (not shown), for example a hydraulic motor.

In operation, in the case of harvesting a tree to be processed, the head is brought into a proper position at the bottom of the tree, with rollers 34 in the processing position but moved away from each other and with grappling/delimbing arms 12, 14 moved away from each other. The arms 12, 14 and rollers 34 are then caused to move toward each other in order to grip the tree, which is thereafter cut with the chain saw 24. After the tree has been lowered into a horizontal position, the rollers 34 are engaged to drive the tree between the arms 12, 14 and the knife 16, to effect the delimbing. With the wheel 27 continually measuring the length of the tree, it is possible to cut the delimbed trunk into segments of a predetermined length. At the end of the operation, drive rollers 34 are caused to move away from each other, thus enabling the operator to pick up the next tree from the ground or a pile.

For processing a tree that has already been felled and placed onto the pile of trees (for example cutting into predetermined lengths), the head is brought into position with the rollers 34 retracted into the grappling position. After the tree has been grappled by causing arms 12, 14 to move toward each other, lifted from the pile and brought into horizontal position, the rollers 34 are caused to move into the processing position and toward each other. Rollers 34 are then engaged to drive the tree between the arms 12, 14 and the knife 16 (which can be either fixed or moveable and if moveable either sliding or pivotal), to effect the delimbing as previously discussed. At the end of the operation, drive rollers 34 are caused to move away from each other and could then be retracted into the grappling position, if the operator wishes to pick another tree from the pile.

This description is made with reference to the preferred embodiment of the invention. It is, however, possible to apply the principles of the present invention to a wide variety of harvesting and processing heads. Many other variations and modifications could be made without departing from the scope and spirit of the present invention.

What is claimed is:

1. A tree harvesting and processing head comprising:
   a body with means for attaching the head to a mobile machine;
   at least two pairs of grappling arms, pivotally mounted to the body for movement toward and away from each other, the first pair being mounted adjacent one end and the second pair being mounted adjacent the other end of the body, the grappling arms defining therebetween a grappling zone which extends along the length of the head;

a delimbing knife;

a cutting device for cutting a tree in the grappling zone; and at least one pair of drive rollers wherein the drive rollers are pivotally mounted for movement to a processing position in which the rollers are in the grappling zone and to a grappling position in which the rollers are outside of the grappling zone;

wherein, there is a cross beam which is pivotally mounted to the body between the first and the second pairs of grappling arms and each drive roller is mounted on the cross beam so that the rollers move in unison and independently of the grappling arms into and out of the grappling zone upon pivotal movement of the cross beam.

2. A tree harvesting and processing head according to claim 1, wherein the delimbing knife is mounted on one of the grappling arms.

3. A tree harvesting and processing head according to claim 2, wherein an additional delimbing knife is mounted to the body.

4. A tree harvesting and processing head according to claim 3, in which the additional delimbing knife is slidably mounted to the front end of the body.

5. A tree harvesting and processing head according to claim 4, wherein the attachment means comprises a tilt frame and means rotationally mounted thereto.

6. A tree harvesting and processing head according to claim 5, wherein the cutting device comprises a chain saw.

7. A tree harvesting and processing head according to claim 6, wherein the chain saw is mounted to one end of the body.

8. A tree harvesting and processing head according to claim 1, wherein each of the drive rollers is pivotally mounted to one end of the cross beam.

9. A tree harvesting and processing head according to claim 8, wherein each of the drive rollers is rotationally mounted to one of a pair of support members, each of the pair of support members being pivotally mounted to one end of the cross beam.

10. A tree harvesting and processing head of claim 9 wherein the delimbing knife is mounted on one of the grappling arms.

11. A tree harvesting and processing head of claim 10 in which an additional delimbing knife is slidably mounted to the body.

12. A tree harvesting and processing head for suspension from the support of a mobile machine comprising:

(a) a body pivotally mounted on positioning means which are rotationally mounted to a mobile machine;

(b) at least two pairs of grappling arms pivotally mounted to the body for movement toward and away from each other, the grappling arms defining therebetween a grappling zone which extends along the length of the head from top to bottom;

(c) a delimbing knife slidably mounted on the body at the top;

(d) a saw mounted to the body at the bottom end;

(e) a cross beam pivotally mounted to the body between the first and second pairs of grappling arms and transverse to the grappling zone;

(f) two support arms one pivotally mounted on each end of the cross beam;

(g) two drive rollers, one mounted on each arm and in which the movement of the cross beam pivotally moves the drive rollers into and away from a processing position in which the rollers are in the grappling zone and can drive trees in such zone along the zone to engage the delimbing knives, and such pivotal movement can move such rollers into and out of a grappling position in which the rollers are not in the grappling zone and do not interfere with the grappling arms when the head is grappling trees.

* * * * *